United States Patent [19]
Kreutzer

[11] Patent Number: 5,820,894
[45] Date of Patent: Oct. 13, 1998

[54] METHOD AND APPARATUS FOR CONSOLIDATING A WORKPIECE AT ELEVATED TEMPERATURE

[75] Inventor: Robert William Kreutzer, Poway, Calif.

[73] Assignee: McDonnell Douglas Corporation, Huntington Beach, Calif.

[21] Appl. No.: 539,880

[22] Filed: Oct. 6, 1995

[51] Int. Cl.⁶ .................................................. B29C 67/14
[52] U.S. Cl. ...................... 425/389; 425/392; 425/405.1; 425/DIG. 44; 264/313; 264/570; 264/571
[58] Field of Search .................................. 425/389, 392, 425/405.1, DIG. 44; 264/313, 570, 571

[56] References Cited

U.S. PATENT DOCUMENTS

| | | |
|---|---|---|
| 1,854,498 | 4/1932 | Anderson . |
| 1,884,529 | 10/1932 | Benner et al. . |
| 2,107,587 | 2/1938 | Smith . |
| 2,148,704 | 2/1939 | Merritt . |
| 2,172,002 | 9/1939 | Stanley ...................................... 100/48 |
| 2,634,773 | 4/1953 | Weyant . |
| 2,636,539 | 4/1953 | Pajak . |
| 4,190,484 | 2/1980 | Pohl . |
| 4,411,380 | 10/1983 | McWithey et al. . |
| 4,420,958 | 12/1983 | Schulz et al. . |
| 5,366,684 | 11/1994 | Corneau, Jr. ............................. 264/510 |
| 5,447,668 | 9/1995 | Delangis ................................. 264/101 |
| 5,464,337 | 11/1995 | Bernardon et al. ..................... 425/112 |
| 5,578,158 | 11/1996 | Gutowski et al. ....................... 156/285 |
| 5,665,301 | 9/1997 | Alanko .................................... 264/571 |

*Primary Examiner*—David W. Wu
*Attorney, Agent, or Firm*—Bell Seltzer Intellectual Property Law Group of Alston & Bird, LLP

[57] ABSTRACT

A consolidation apparatus includes a female mold having a first portion and a second portion, a movable caul plate within the first portion of the female mold, and a pressure bladder disposed between the caul plate and the second portion of the female mold. A pressurization line communicates between the interior of the pressure bladder and a gas source exterior to the female mold, and an evacuation line communicating between the unfilled space between the caul plate and the second portion, and a vacuum source exterior to the female mold. In using the apparatus, a workpiece is loaded into the first portion of the female mold between the caul plate and the first portion. The consolidation apparatus and the workpiece contained therein are heated, a pressure is applied to the pressurization line, and a vacuum is simultaneously applied to the evacuation line.

13 Claims, 3 Drawing Sheets

METHOD AND APPARATUS FOR CONSOLIDATING A WORKPIECE AT ELEVATED TEMPERATURE

BACKGROUND OF THE INVENTION

This invention relates to the consolidation of workpieces at elevated temperatures, and, more particularly, to consolidation of composite workpieces at moderately elevated temperatures.

A number of manufacturing operations for advanced structures, such as those made of nonmetallic composite materials, require the consolidation of workpieces at elevated temperature. As an example, the fabrication of structures using nonmetallic, fiber-reinforced composite materials typically involves layup of prepreg pieces of the composite material and subsequent pressing of the prepreg pieces at elevated temperature to consolidate and cure the pieces. In another example, syntactic foams are prepared by placing a foam-forming mixture of curable polymer precursor and hollow second phase particles into a form, and simultaneously heating and applying a force to the mixture to achieve a consolidated, cured foam article having a shape defined by the die to which the force is applied. Some of the parts made in these ways can be quite large in lateral extent.

In these cases, a moderate pressure of a few pounds per square inch to several hundred pounds per square inch is applied during the consolidation and curing operation at elevated temperature. The pressure need not be large, but its presence is essential to the success of the fabrication processing.

Two techniques have generally been used to apply the consolidation pressure. In one, the workpiece is placed inside an elastomeric bag, which in turn is placed inside an autoclave (an oven with a pressurizable heating cavity). The autoclave is simultaneously heated and pressurized. This approach is successful, particularly where the final article is complexly shaped and where the workpiece itself defines the extent to which consolidation can occur. This bagging technique has limitations on the temperature to which the workpiece can be heated, since at the present time there are no elastomeric bag materials suitable for use above about 450–500° F., and on the form to which the workpiece can be consolidated in the event that the workpiece is highly compliant. The bagging technique is also typically time consuming and costly, because the bagging operation itself involves a layup procedure and because the autoclave is expensive. Moreover, when the workpiece is large in lateral extent, a substantial structural support to react the consolidation pressure must be provided. The large structural support requires longer heating times in the autoclave because of its large thermal mass.

Alternatively, hydraulic presses with movable rams extending into an oven cavity have been used to apply a consolidation force. While operable, this approach is expensive for articles of large lateral extent and also requires the use of complex tooling. Consequently, it is not widely used for such operations.

There is therefore a need for an improved approach for simultaneously heating and consolidating a workpiece, particularly a large workpiece, at moderately high temperatures. The present invention fulfills this need, and further provides related advantages.

SUMMARY OF THE INVENTION

The present invention provides an apparatus and method for consolidating workpieces at elevated temperature. The approach is operable for workpieces of small or large lateral extent, but its greatest advantages are found when larger workpieces are processed. Heating is accomplished using an oven instead of an expensive autoclave. The size of the structural support mass required for the apparatus is relatively small and of low thermal mass, so oven heating times and energy consumption are reduced as compared with conventional consolidation apparatus. Consolidation can occur at higher temperatures than possible with processes using conventional elastomeric bagging material. Process cost is reduced through reduced assembly requirements and reduced waste. The approach is also safer to practice than the bagging technique, due to the use of lower pressures at elevated temperatures.

In accordance with the invention, a consolidation apparatus comprises a female mold having a first portion and a second portion, and a movable caul plate within the first portion of the female mold. The caul plate, part of the first portion of the female mold, and the second portion of the female mold together define a plenum comprising a bladder space and an unfilled space. The apparatus farther includes a pressure bladder, preferably made of stainless steel, disposed between the caul plate and the second portion of the female mold, wherein the pressure bladder fills the bladder space. There is a pressurization line communicating between the interior of the pressure bladder and a gas source exterior to the female mold, and an evacuation line communicating between the unfilled space and a vacuum source exterior to the female mold. The female mold is preferably placed into an oven during processing.

In one embodiment, the first portion of the female mold defines a tray-shaped space, and the second portion of the female mold comprises a closure for the first portion of the female mold. This apparatus further includes a tray flange joined to the first portion of the female mold, a closure flange joined to the closure of the female mold and positioned in facing relation to the tray flange, and means for removably joining the closure flange to the tray flange. There is desirably a vacuum seal between the closure flange and the tray flange. A liner, preferably made of aluminum, may be placed within the first portion of the female mold.

In accordance with a processing aspect of the invention, a method for consolidating a workpiece comprises the steps of providing a consolidation apparatus like that described above and loading a workpiece, preferably a syntactic foam precursor, into the first portion of the female mold between the caul plate and the first portion. The method further includes heating the consolidation apparatus and the workpiece contained therein, applying a pressure to the pressurization line, and applying a vacuum to the evacuation line, these steps preferably occurring simultaneously.

In the approach of the invention, the bladder is located in part of the space between the second portion of the female mold and the caul plate. A vacuum is applied within the remainder of this volume. The vacuum serves to partially or completely negate the force that must be contained by external structure, as compared with an apparatus where no vacuum can be applied. This approach is preferably utilized when the bladder pressure is about 15 pounds per square inch or less, but can be utilized with a beneficial effect even for higher bladder pressures.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
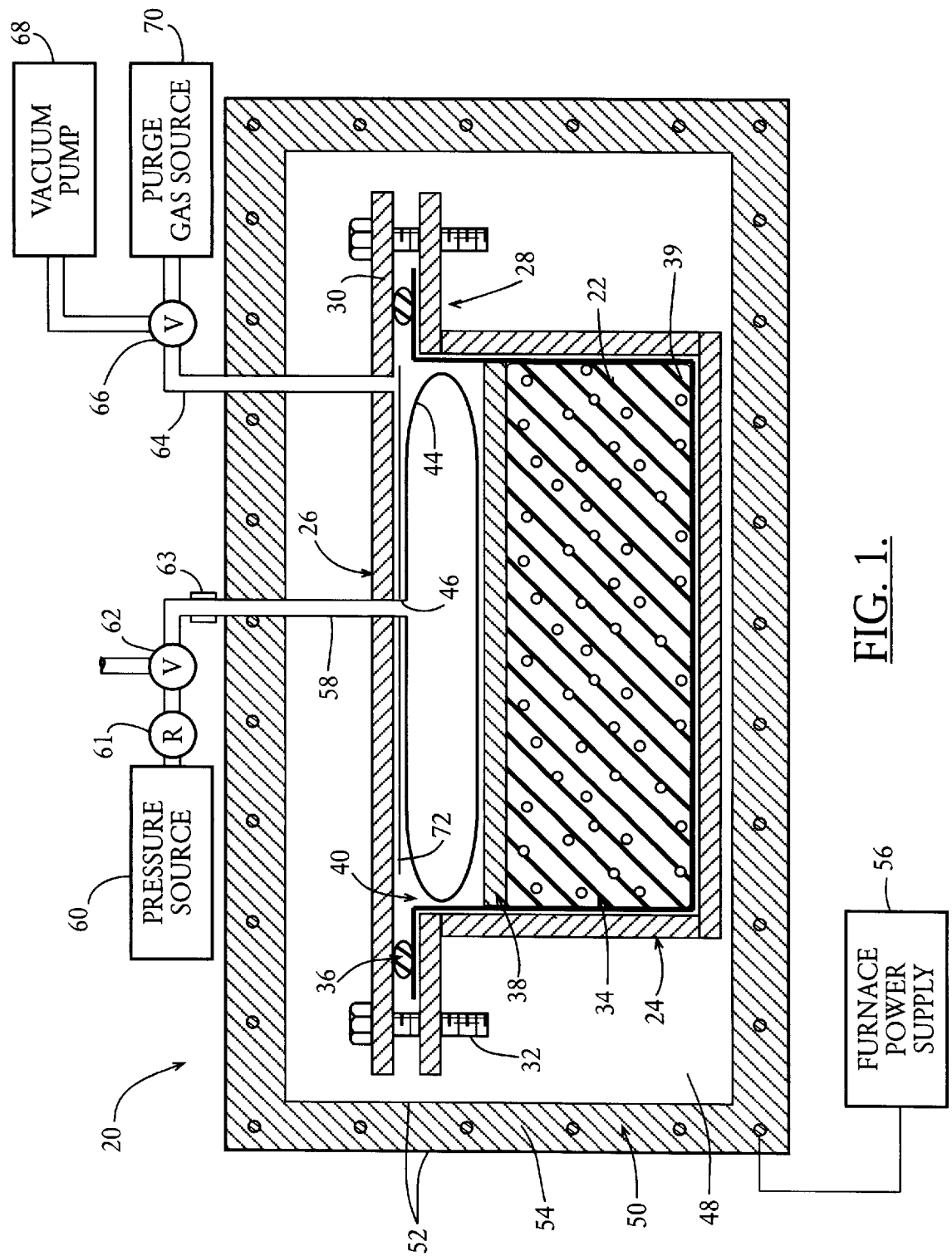
FIG. 1 is a schematic side sectional view of a preferred apparatus for practicing the invention.

FIG. 1 illustrates an apparatus 20 used to consolidate a workpiece 22 at elevated temperature. The apparatus 20 includes a first portion, here shown as a bottom tray 24, and a second portion, here shown as a closure 26. The bottom tray 24 has a bottom tray flange 28 joined thereto, and the closure 26 has a closure flange 30 joined thereto. The bottom tray flange 28 and the closure flange 30 are positioned in facing relation to each other. A series of bolts 32 extend through registered bores in the bottom tray flange 28 and the closure flange 30 and, in cooperation with a series of nuts that screw onto the bolts 32, hold the closure flange 30 to the bottom tray flange 28.

Optionally and preferably, a liner 34 is placed into the bottom tray 24. The liner 34 is preferably a thin piece of foil of a material such as aluminum, molded to conform to the interior wall of the bottom tray 34. The liner 34 extends out of the top of the bottom tray 24 and is folded over the bottom tray flange 28. A seal in the form of a continuous bead 36 of sealant such as a silicone RTV sealant, or an O-ring, is placed between the liner 34 and the closure flange 30, to act as a pressure and vacuum seal for the space between the interior of the liner 34 and the closure 26.

A caul plate 38 resides within the interior of the bottom tray 24. The caul plate 38 fits closely to that portion of the liner 34 where it lies over the side walls of the bottom tray 24. The caul plate 38 is oriented to divide the volume within the interior of the bottom tray 24 into a lower volume 39 and an upper volume 40. The caul plate 38 slides downwardly during the consolidation operation, so that the sizes of the lower volume 39 and the upper volume 40 are controllably varied. During the consolidation operation, the lower volume 39 is filled with the workpiece 22, which is preferably a syntactic foam precursor or a laid-up fiber/resin composite material. As the caul plate slides down, the lower volume 39 and thence the volume of the workpiece 22 are reduced.

Figure 2A:
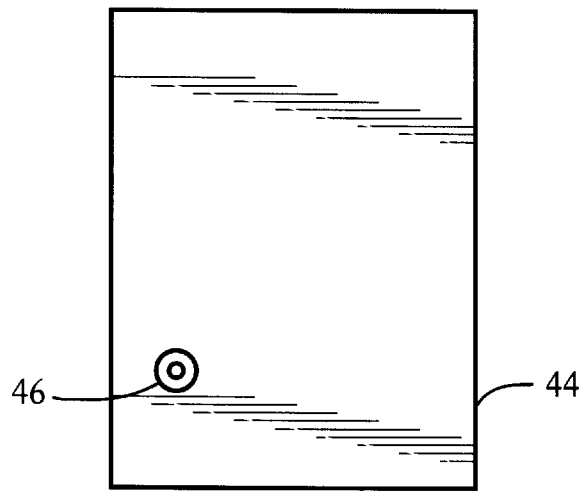
FIG. 2A is a plan view of the bladder.
Figure 2B:
FIG. 2B is a side elevational view of the bladder.
Figure 3:
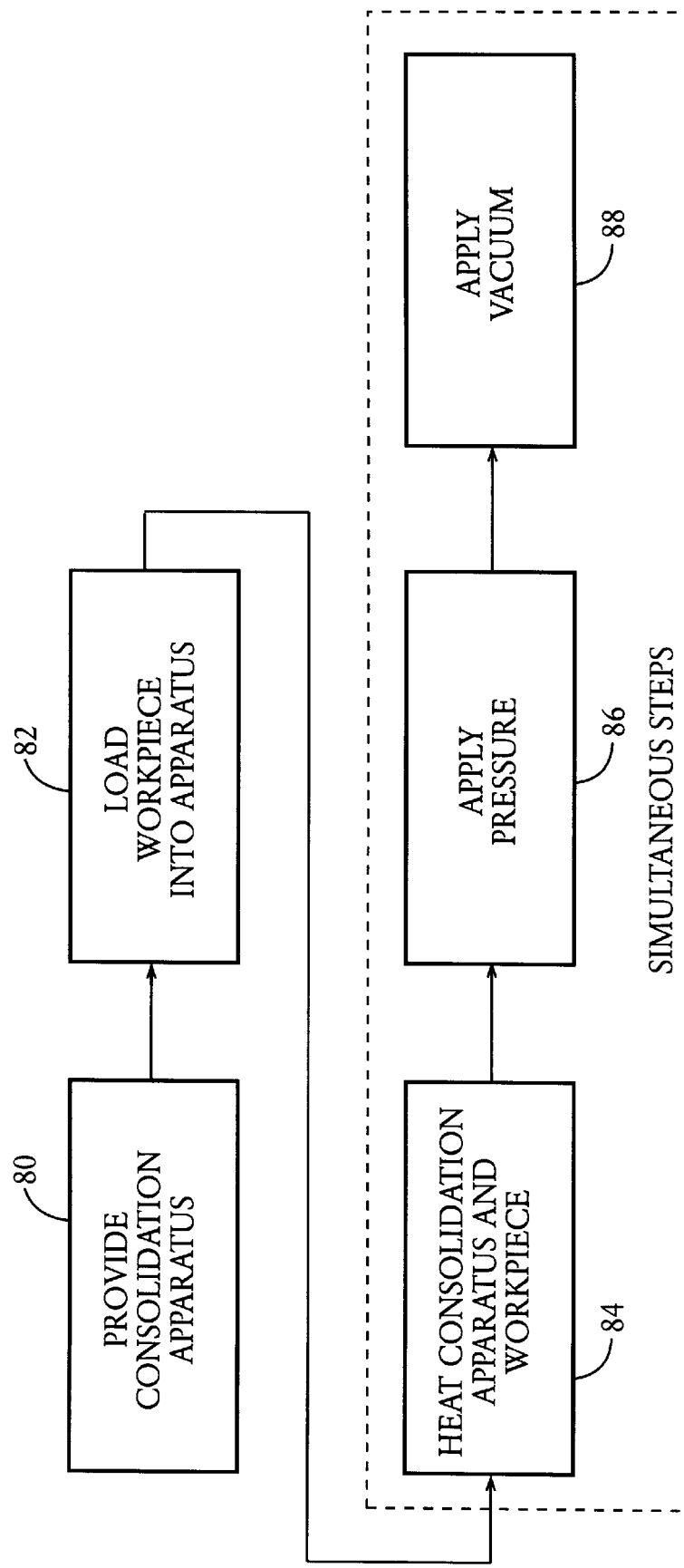
FIG. 3 is a process block flow diagram for practicing a method according to the invention.

A deformable pressure bladder 44 is placed into the upper volume 40, but does not fill the upper volume 40. The bladder 44, shown in greater detail in FIGS. 2 and 3, is generally flat and is formed of facing pieces of material held together with a lap splice at the ends. A nipple 46 communicates with the interior of the bladder 44. When gas is forced into the bladder 44 so that it inflates, the facing pieces deform so that the bladder 44 changes from the flat shape shown in FIGS. 2A and 2B to the generally pillow shape shown in FIG. 1. The bladder 44 shown in FIGS. 1–2 is rectangular with nearly equal length sides when viewed in plan view (FIG. 2A), but the bladder can be of any plan-view shape required by the final shape of the workpiece 22.

The assembly of bottom tray 24, closure 26, and the described interior elements is placed into an interior cavity 48 of an oven 50. The oven 50 can be of any type, but is preferably formed of insulated walls 52 having electric resistance heating elements 54 therebetween. The heating elements 54 are connected to a controllable oven power supply 56.

The nipple 46 is connected to one end of a pressurization line 58. The other end of the pressurization line 58 is connected to a pressure source 60 having a pressure regulator 61, which supplies a controllable gas pressure to the pressurization line and thence to the interior of the bladder 44. A three-way valve 62 in the pressurization line 58 permits the pressure to be directed into the bladder 44, or the pressure bled from the bladder, or sealing of the bladder. A safety valve 63 in the line 58 between the valve 62 and the bladder 44 is set to a maximum pressure value, and opens if the pressure in the line 58 exceeds that value.

The bladder 44 occupies a portion of the upper volume 40. The remainder of the upper volume 40, an unfilled space, is controllably purged with a gas or evacuated. An evacuation line 64 has one end in communication with the upper volume 40 portion of the interior of the assembled bottom tray 24 and closure 26. The other end of the evacuation line 64 selectively communicates through a selection and control valve 66 with either a vacuum pump 68 or a purge gas source 70. In operation of the apparatus 20, the valve 66 is operated to either evacuate the unfilled space portion of the upper volume 40 or backfill it with the purge gas, which is typically nitrogen or an inert gas such as argon.

A vent cloth 72 or other means for communicating the upper volume 40 over the interior of the closure is optionally placed between the upper surface of the bladder 44 and the interior surface of the closure 26. The vent cloth 72 is a loose weave of fibers that physically separates the upper surface of the bladder 44 from the interior surface of the closure 26 to permit gas to be evacuated therefrom, while still transmitting the mechanical pressure of the bladder 44 to the closure 26 when it is inflated.

FIG. 3 illustrates a preferred approach for practicing the present invention. A consolidation apparatus is provided, numeral 80, preferably the apparatus 20. A workpiece, such as the workpiece 22, is loaded into the consolidation apparatus, numeral 82. As noted, the workpiece is preferably a syntactic foam precursor material or an unconsolidated fiber-reinforced resin composite material layup. The bottom tray and closure are assembled and closed in the manner previously described.

The apparatus 20, including the workpiece 22, is heated to elevated temperature, numeral 84. The heating follows a temperature-time schedule selected to cure the workpiece, according to information provided by the manufacturer of the material(s) used in the workpiece. The temperature-time schedule is specific to the particular workpiece being processed.

At the same time, pressure is applied to the interior of the bladder 44 from the pressure source 60 to consolidate the workpiece to its required size (numeral 86), and a vacuum is applied to the remaining unfilled portion of the upper volume 40 through the evacuation line 64 (numeral 88). The bladder pressure reacting against the inside surface of the closure tends to bow the closure outwardly, while the vacuum in the unfilled space inside the closure tends to bow the closure inwardly. The preferred state is an absence of bowing on the closure, or, stated alternatively, a net zero force on the closure. The application of pressure and vacuum are therefore applied so as to balance and minimize the net force against the closure 26 and consequently the tendency of the closure to bow.

As a result of the pressure balancing, the closure may be made relatively thin and of low thermal mass. The entire apparatus may therefore be heated and cooled more rapidly than would otherwise be the case. Because the maximum vacuum that is achievable is about 15 pounds per square inch (psi), the preferred maximum bladder pressure applied in the step 86 is also about 15 psi so as to achieve a net balanced force on the closure. Many consolidation operations use low bladder pressures of less than about 15 psi, so the preferred technique can be used in these operations. However, the present approach also achieves a reduction in net force on the closure for higher bladder pressures, and can be used for such processing as well.

Because a metallic bladder 44 is used, the consolidation may be accomplished at a higher temperature than possible with conventional bagging consolidation operations using elastomeric bagging materials, which are limited to temperatures of about 450–500° F. The present approach may be used at consolidation temperatures as high as about 750° F. using the present approach with the seal 36. The limiting consideration for maximum temperature is degradation of the sealant 36. If the sealant 36 is replaced with a metallic vacuum seal, the seal is cooled, or no seal is used and a large vacuum pump 68 is provided to compensate for leakage between the flanges 28 and 30, even higher temperatures may be reached in the consolidation operation.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A consolidation apparatus, comprising:
   a female mold having a first portion and a second portion;
   a movable caul plate within the first portion of the female mold, wherein the caul plate, part of the first portion of the female mold, and the second portion of the female mold together define a plenum comprising a bladder space and an unfilled space;
   a pressure bladder disposed between the caul plate and the second portion of the female mold, wherein the pressure bladder fills the bladder space;
   a pressurization line communicating between the interior of the pressure bladder and a gas source exterior to the female mold; and
   an evacuation line communicating between the unfilled space and a vacuum source exterior to the female mold for lowering the pressure in the unfilled space and reducing the total force applied to the second portion of the female mold.

2. The apparatus of claim 1, wherein
   the first portion of the female mold defines a tray-shaped space,
   the second portion of the female mold comprises a closure for the first portion of the female mold, and wherein the apparatus further includes
   a tray flange joined to the first portion of the female mold,
   a closure flange joined to the closure of the female mold and positioned in facing relation to the tray flange, and
   means for removably joining the closure flange to the tray flange.

3. The apparatus of claim 2, further including a vacuum seal between the closure flange and the tray flange.

4. The apparatus of claim 1, wherein the bladder is made of steel.

5. The apparatus of claim 1, further including a liner within the first portion of the female mold.

6. The apparatus of claim 5, wherein the liner is made of aluminum.

7. The apparatus of claim 1, further including means for communicating the unfilled space across an interior surface of the second portion of the female mold.

8. The apparatus of claim 1, further including an oven in which the female mold is received.

9. The apparatus of claim 1, further including a mass of syntactic foam precursor within the first portion of the female mold.

10. A consolidation apparatus, comprising:
    a female mold having
       a bottom tray,
       a bottom flange joined to the bottom tray
       a closure,
       a closure flange joined to the closure and positioned in facing relation to the bottom flange, and
       a plurality of bolts extending through the closure flange and the bottom flange;
    a movable caul plate disposed within the bottom tray;
    a pressure bladder disposed within, but not filling, a plenum between the caul plate and the closure;
    a pressurization line communicating between the interior of the pressure bladder and a gas source exterior to the female mold; and
    an evacuation line communicating between that portion of the plenum not containing the pressure bladder and a vacuum source exterior to the female mold for lowering the pressure in that portion of the plenum not containing the pressure bladder and reducing the total force applied to the closure.

11. The apparatus of claim 10, further including a liner within the bottom tray.

12. The apparatus of claim 10, further including means for communicating the unfilled space across an interior surface of the closure.

13. The apparatus of claim 10, further including an oven in which the female mold is received.

* * * * *